United States Patent [19]

Glynn, Jr.

[11] Patent Number: 5,397,389

[45] Date of Patent: * Mar. 14, 1995

[54] ASPHALTIC CONCRETE PRODUCT AND A METHOD FOR THE FIXATION OF CONTAMINATED SOILS AND HAZARDOUS MATERIALS IN THE ASPHALTIC CONCRETE

[75] Inventor: John J. Glynn, Jr., Southborough, Mass.

[73] Assignee: American Reclamation Corp., Southborough, Mass.

[*] Notice: The portion of the term of this patent subsequent to Sep. 7, 2010 has been disclaimed.

[21] Appl. No.: 204,874

[22] Filed: Mar. 2, 1994

Related U.S. Application Data

[60] Division of Ser. No. 978,868, Nov. 19, 1992, Pat. No. 5,344,485, which is a continuation-in-part of Ser. No. 726,858, Jul. 8, 1991, Pat. No. 5,173,115, which is a continuation of Ser. No. 496,962, Mar. 20, 1990, abandoned.

[51] Int. Cl.$^6$ ............................................. C08L 95/00
[52] U.S. Cl. ................................. 106/281.1; 106/277; 106/282; 106/284.01; 106/284.02; 588/252; 588/257
[58] Field of Search ...................... 106/277, 281.1, 282, 106/284.01, 284.02; 588/252, 257

[56] References Cited

U.S. PATENT DOCUMENTS

| | | | |
|---|---|---|---|
| 1,778,461 | 10/1930 | Nicholson | 106/282 |
| 2,323,435 | 5/1940 | Wiseblood | 106/281.1 |
| 2,750,297 | 6/1956 | Doherty | 106/277 |
| 4,373,961 | 2/1983 | Stone | 106/281.1 |
| 4,706,893 | 11/1987 | Brock | 241/101 B |
| 4,738,996 | 4/1988 | Vonk et al. | 106/277 |
| 5,173,115 | 12/1992 | Glynn, Jr. et al. | 106/282 |
| 5,236,497 | 8/1993 | Grzybowski | 106/282 |
| 5,242,493 | 9/1993 | Glynn, Jr. et al. | 106/281.1 |

FOREIGN PATENT DOCUMENTS 15645  9/1992  WIPO ........................... 106/281.1

OTHER PUBLICATIONS

"Petroleum Contaminated Soils", Kostecki et al., vol. I, 1989, pp. 191–199.
"Making Use of Contaminated Soil", Czarnecki, Civil Engineering Dec. 1988.

*Primary Examiner*—Helene Klemanski
*Attorney, Agent, or Firm*—Samuels, Gauthier & Stevens

[57] ABSTRACT

A composition for the fixation of hydrocarbons from contaminated oily soil and hazardous wastes. The hazardous waste and contamined oily soil are components in a cold mix asphaltic concrete. The soil and hazardous materials are mixed with asphaltic roof cuttings and mineral aggregate to form the mixture. The mixture is coated with a cold mix emulsion to form an asphaltic concrete. The hydrocarbons and hazardous wastes do not leach from the set concrete.

19 Claims, 1 Drawing Sheet

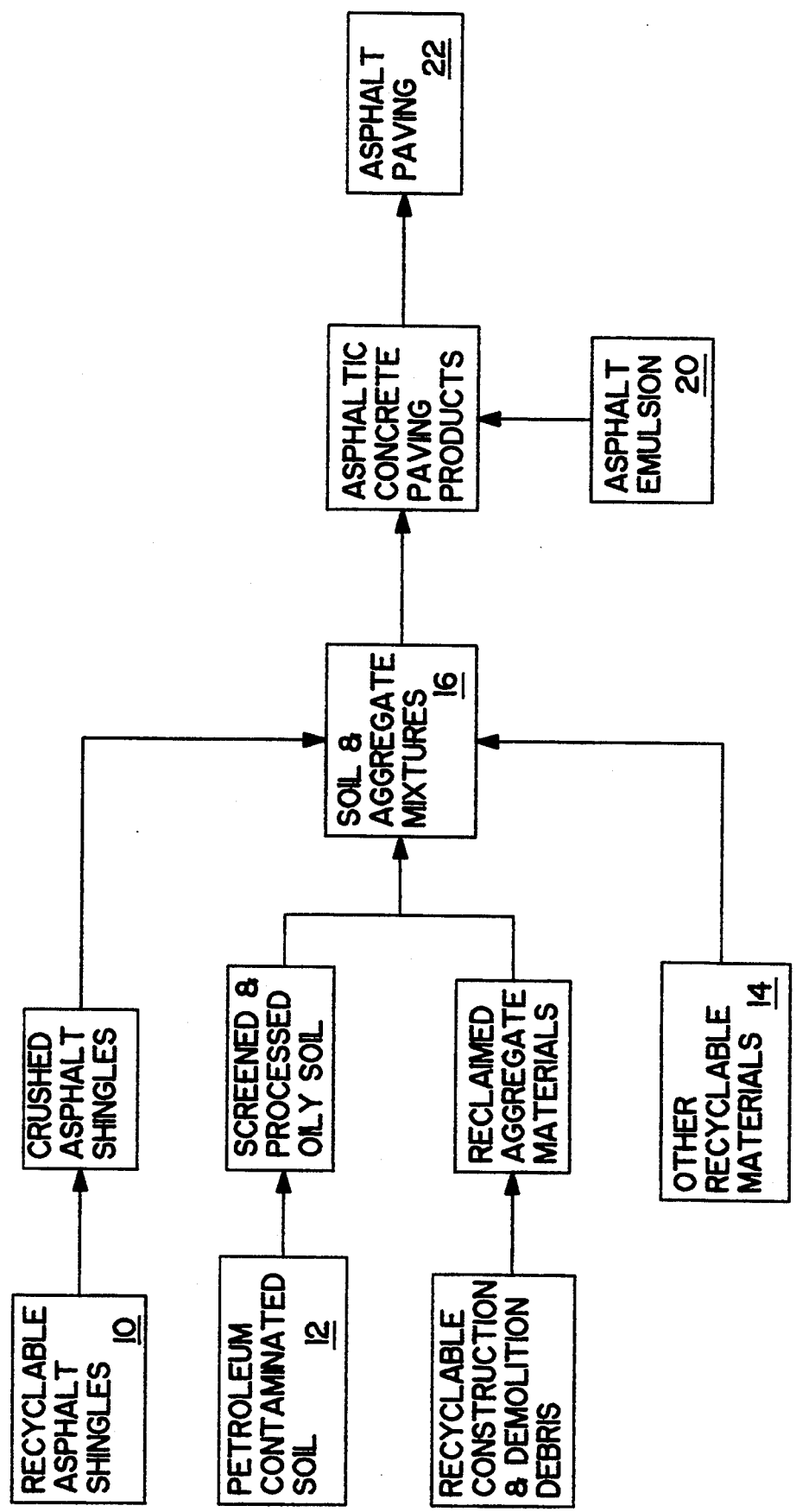

ASPHALTIC CONCRETE PRODUCT AND A METHOD FOR THE FIXATION OF CONTAMINATED SOILS AND HAZARDOUS MATERIALS IN THE ASPHALTIC CONCRETE

This is a divisional of application Ser. No. 07/978,868, now U.S. Pat. No. 5,344,485, filed on Nov. 19, 1992, which is a continuation-in-part of U.S. application Ser. No. 07/726,858, filed Jul. 8, 1991, now U.S. Pat. No. 5,173,115, which is a continuation of U.S. application Ser. No. 07/496,962, filed Mar. 20, 1990, now abandoned.

BACKGROUND OF THE INVENTION

This invention relates to a method of fixing contaminated soils in asphaltic concrete and the concrete manufactured by the method.

The essence of a "concrete" is viscosity or thixotropicity. At the time of application it has to be quasiliquid, like a slurry, or at least a material with a pasty plasticity that can be deformed by mechanical operations into the shape in which it is to be used. It has to be able to adhere to a surface if it is a coating, and it has to set up into a degree of hardness that is suitable for the kind and class of operation.

Unlike those concretes which are used as structural elements, asphaltic concrete is generally applied as a layer on a nearly horizontal surface or as a low structure such as a curb or "speed bump". As a regulated component in the governmental infrastructure, asphaltic concrete is subject to very stringent specifications down to the particle size distribution of the aggregate, but for private and commercial use quite satisfactory performance can be achieved with a considerable variation in formulations. Asphaltic concretes containing additives like rubber can be made for special uses like tennis courts and running tracks.

The use of asphalt as an adhesive has a very long history. Some of the most primitive artifacts, like spears and arrows, used naturally-occurring asphalt and natural fibers to attach the stone point to the wooden shaft. It has also been used as a preservative by means of encapsulation-asphalt is found in the formulary of Egyptian mortuaries of the classic period.

Asphalt is produced as a joint product with gasoline and oil in the refining of crude oils. In principle, crude oil could be reconstituted by mixing asphalt, oil, kerosene, gasoline, and naphtha in the proper proportions. In practice, asphalt and the other petroleum products are miscible, if not quite in any proportion, at least over very wide ranges of proportions. If asphalt and kerosene are mixed, a dirty-brown kerosene, or a gummy asphalt, or an intermediate oily substance can result; but within wide variations the mixture does not divide into phases. A small proportion of petroleum product mixed with asphalt merely produces asphalt of a slightly different specification or characterization.

Turning asphalt into concrete involves producing a material that is plastic when it is applied and hard when it sets up, and there are two conventional ways of doing that. They are, for appropriate reasons, called the "hot mix" and "cold mix" processes.

In the hot mix process, the asphalt is liquified by heating. As in most things, the viscosity of asphalt decreases with increasing temperature and it is a liquid at a temperature sufficiently below its flash point at which it is safe to use. The melted asphalt is mixed with aggregate and kept hot during the mixing stage. It is then transported, still hot, to the workplace, or it is stored in heated silos until it can be transported.

Obviously this hot liquid asphalt cannot be mixed with cold, wet aggregate. If the aggregate is cold enough it will immediately cause the asphalt to cool, producing a solidified mass of asphaltic concrete where a plastic mass is desired. If the aggregate is wet there will be explosions of steam when it mixes with the hot asphalt. Hot mix plants, therefore, incorporate a rotary kiln to dry the aggregate and heat it to a few hundred degrees F. It then mixes with the asphalt without difficulty.

The use of hot mix asphalts with contaminated soil has been described. When the aggregate is soil contaminated with petroleum products the kiln drying process introduces a number of problems, or at least constraints. The conventional asphalt plant drying kiln is heated with an open flame directed into the rotating barrel from the outlet end. Obviously the first constraint must be that the contamination level is sufficiently low so the open flame does not ignite the petroleum or cause the vapors to explode.

As the aggregate progresses down the rotary kiln it gradually heats up to the 500°-800° F. that it reaches at the outlet of the kiln. This produces a gradual distillation of the contamination, so that the light ends are driven off near the entry to the kiln, where there may be no open flame. They are then typically drawn off by exhaust fans, and pass through the air pollution control system (usually a cloth filter or "baghouse"), and are exhausted into the atmosphere. Since these unburned hydrocarbon fumes are not collected by the baghouse, they can contribute significantly to the air pollution produced by the hot mix plant.

As the contaminated soil proceeds down the kiln, the heavier components are distilled off. If these are not ignited by the open flame heater, they will be drawn off by the exhaust fans and cooled in the plenum of the baghouse. There they can combine with the airborne particulates ("fines") and produce a kind of asphaltic concrete that adheres to the baghouse filters, making them difficult to keep clean. Those heavy components that remain with the aggregate are no problem because they combine with the liquid asphalt in the mixing part of the operation.

In the cold mix process, when the concrete is mixed, the asphalt is in the form of an emulsion in which the particles of asphalt are kept suspended in the liquid and separated from each other and the aggregate by a film of water. Under pressure, the film of water is expelled and the asphalt comes into contact with itself and the aggregate. In the process it cements the aggregate into a hard concrete that is essentially identical to the hot mix bituminous concrete.

Some of these emulsions incorporate oils as well as the usual asphalt, water, and emulsifying agents because the oil serves to soften the asphalt and make for better adhesion to other additives and fillers.

The use of cold mix asphalts with contaminated soils is known. Although attempts have been made to process hydrocarbon contaminated soils directly into cold mix concretes, the results have not been satisfactory. In order to use asphaltic concrete, either federal or state regulations must be complied with. These regulations pertain both to the physical properties of the material to be used—whether it's a base layer, intermediate layer, or top coat and to the chemical properties, since the components of the asphaltic concrete must not leach. The drawbacks in the use of the contaminated soils are, first, the soil itself may range from stone, sand, silt to clay and thus have a wide range of sizes, including rocks, etc. Secondly, the soil may contain in varying amounts, gasoline, lubricating oils, and Nos. 2 through 6 fuel oils in any combination. This requires that a soil and chemical analysis be made. If the contaminated soil is to be used, then the other standard components used in the process for making asphaltic concrete must be adjusted each time in order to accommodate each different batch of contaminated soil to produce an asphaltic concrete that meets specification. More importantly, because of the uncertainty of the precise nature of the chemical contaminants, at the minimum a sample batch of bituminous concrete must be made and tested. Even if the sample meets specifications re: leaching, when the process is scaled up for a production run, due to the normal problems encountered in such a scale up, there still is not complete certainty the final product will meet specifications. At least for these reasons, the use of contaminated soils in cold mix asphaltic concrete has not gained rapid commercial acceptance.

Therefore, the art teaches the use of contaminated soils in combination with cold mix asphalt emulsions with or without the use of aggregate to stabilize hazardous materials in soils such as chlorinated solvents, organic solvents, such as toluene, xylenes, ethylbenzene, ethyl acetate and 2-butanone and toxic metals. The resulting product is known as a 'stabilized soil'. However, the art does not teach the use of these contaminated soils with cold mix emulsions, aggregates and fibrous materials to both stabilize the hazardous materials and to make a concrete product that meets the specifications for paving roadways. Further, in addition to stabilizing the aforementioned hazardous materials the following are also stabilized with the invention disclosed herein: the RCRA eight heavy metals (As, Ba, Cd, Cr, Hg, Ni, Pb and Se); cyclic hydrocarbons with high partition coefficient such as PCBs, PAHs; and halogenated hydrocarbons. Recycled wastes may also be fixed in the concrete. The wastes include plastic wastes, such as plasticized polyvinyl butyral, ground or shredded rubber tires, crushed or granulated glass and tear-off roofing shingles (which are to be distinguished from unused asphalt roof shingles).

I have discovered a process and the product of the process that uses petroleum contaminated soils for the manufacture of cold mix asphaltic concrete. In the prior application, a process was discloced which fixed the petroleum hydrocarbons such that they did not leach from the final product. This fixation was consistent regardless of either the hydrocarbon mix or the soil mix. After an initial analysis of the contaminated soil, it was then used directly in production runs. I have discovered that the process and product is also applicable to soils contaminated with a wide range of hazardous materials whether or not that soil is also contaminated with petroleum hydrocarbons.

SUMMARY OF THE INVENTION

Broadly, the invention mixes recyclable aggregate materials, contaminated soils, fibrous asphalt shingles and asphalt emulsion to form an asphaltic concrete mixture.

The recyclable aggregate materials can include various crushed mineral aggregates such as crushed construction/demolition rubble, asphalt paving materials, construction concrete, bricks, concrete, glass and stone. The recyclable materials may also contain asphalt, as in the cases of crushed asphalt paving and fibrous asphalt shingles. Fibrous asphalt shingles have a hydrocarbon content of about 25% by weight. The fibrous material is typically fiberglass matting material. In the preferred embodiment the source of the fibrous asphalt is waste cuttings of asphalt roofing shingles. The specifications for these shingles are defined in ASTM Spec. No. D3462, D3018 and D225, which specifications are hereby incorporated by reference in their entireties into this disclosure. Recyclable organic materials such as shredded rubber tires and plastics may also be included in the mixture. And finally, the mixture of the invention also includes soils contaminated with petroleum hydrocarbons. These soils contribute to the overall aggregate content of the asphaltic concrete mixture. The soils may range from clay to gravel having varying particle sizes.

The invention can also mix soils contaminated with hazardous materials into the asphalt concrete product. The hazardous materials can include the following: the RCRA eight heavy metals (As, Ba, Cd, Cr, Hg, Ni, Pb and Se); halogenated hydrocarbons such as trichloroethylene, ethylene dibromide, vinyl chloride, methylene chloride and 1,1,1-trichloroethane; and cyclic hydrocarbons with high partition coefficients, such as PAHs and PCBs.

These hazardous materials can be present in the soil individually, in various combinations, and in combination with petroleum hydrocarbons. When all materials are mixed and coated with the asphalt emulsion, the hazardous constituents are fixed in the concrete when the concrete is set. The cured and hardened asphaltic concrete prevents hazardous contaminants from leaching out of the concrete mixture.

The asphalt emulsion comprises those emulsions currently used as 'cold mix emulsions'. Preferably, these emulsions are slow-setting emulsions known in the trade as SS-1 and SS-1h emulsions. These emulsions are defined in ASTM Specification No. D977, which reference is incorporated by reference in its entirety into this disclosure.

Broadly the method of our invention includes mixing asphalt roof cuttings, which contain fibrous materials, with contaminated soil, recyclable aggregate, and other recyclable materials in an amount and aggregate size depending upon the final use of the asphaltic concrete. The mixture is coated with an asphalt emulsion to form the asphaltic concrete. After mixing, the hazardous contaminants originally present are fixed within the concrete and the concrete is used in the standard way.

The composition of the invention comprises a mixture of asphalt roof shingles containing fibrous material, recycled aggregate materials, other recyclable materials, and contaminated soil in a size and an amount depending upon the use of the final product. The materials are coated with a cold asphalt emulsion and all components are mixed in amounts such that the hazardous contaminants are fixed in the concrete when the concrete is set and do not leach therefrom.

BRIEF DESCRIPTION OF THE DRAWING

The drawing is a process flow diagram of a process embodying the invention.

DESCRIPTION OF THE PREFERRED EMBODIMENT(S)

The uses of asphaltic concretes, whether hot mix or cold mix and their compositions, are basically dictated by state, federal and local regulations. The asphaltic concrete disclosed herein meets applicable regulations and particularly meets or exceeds those regulations regarding leaching of contaminants into the ground. The following are exemplary of uses and compositions of the asphaltic concrete disclosed herein.

A typical road paving structure is as follows:

8" Base—2" minus aggregate coated with asphalt emulsion

4" Binder—1" minus aggregate coated with asphalt emulsion

1" Top—½" minus aggregate coated with asphalt emulsion

The Base is usually applied to a depth of 8". It primarily consists of 1 to 2 inch aggregate. This aggregate is placed in a cold mix asphalt mixer and coated with an asphalt oil emulsion. The Base is put in place and compacted with conventional paving equipment.

The binder material can be applied in a thickness of from 2" to 6". The binder primarily consists of 1" minus aggregate. The aggregate is placed into a cold mix asphalt mixer and coated with an asphalt oil emulsion. Compaction is accomplished with conventional hydraulic vibratory rollers.

A formula for a base mixture of the invention is:

| Sieve Size | Total Percent of Aggregate (including Roof Shingles, Other Recycled Wastes, Contaminated Soils, RAP, RAM and Mineral Filler) Passing through Sieve by Weight | |
| --- | --- | --- |
| 2 in. | 100 | |
| ¾ in. | 75–90 | |
| No. 4 | 50–70 | |
| No. 8 | 45–65 | |
| No. 50 | 20–30 | |
| No. 200 | 5–15 | |
| Bitumen content | 7 | Percent by weight of total mix |

This base course mixture meets the following test criteria.

MARSHALL TESTS—Preparation compacted with 50 blows at optimum moisture, and air cured in mold at 70°±5° F. for 24 hours.

| Stability @ 70 ± 5° F., lbs | 1000 (minimum) |
| --- | --- |
| Flow @ 70 ± 5° F., lbs (0.01") | 8–16 |
| Voids (% dry - no water) | 4–10 |
| Voids (%, optimum moisture) | 1–7 |
| Density, PCF | 120 to 150 |

A formula for a binder mixture of the invention is:

| Sieve Size | Total Percent of Aggregate (including Roof Shingles, Other Recycled Wastes, Contaminated Soils, RAP, RAM and Mineral Filler) Passing through Sieve by Weight | |
| --- | --- | --- |
| 1 in. | 100 | |
| ¾ in. | 90–100 | |
| ½ in. | 67–88 | |
| No. 4 | 53–73 | |
| No. 8 | 41–65 | |
| No. 30 | 22–44 | |
| No. 50 | 14–35 | |
| No. 200 | 5–15 | |
| Bitumen content | 4–8 | Percent by weight of total mix |

As used in this disclosure, the following terms shall have the following definitions:

Course Mineral Aggregate

The course mineral aggregate is clean, crushed mineral material consisting of angular fragments obtained by breaking and crushing shattered natural rock, stone and recycled aggregate materials, free from a detrimental quantity of thin elongated pieces, dirt or other objectionable materials. Size is determined by end use.

Fine Mineral Aggregate

The fine mineral aggregate is a blend of natural sand, stone, and stone screenings and screened recycled aggregate. Fine aggregate is natural or the product of a crusher and does not contain excess dirt, clay, organic matter or other deleterious material. Size is determined by end use.

Asphalt Roof Shingles

Asphalt roof shingles preferably do not exceed 1" in size and contain no foreign materials, such as wood, nails or other deleterious substances. Asphalt roof shingles contain asphalt, fiberglass fibers, and crushed stone.

Contaminated Soil

This refers to two classes of contaminated soil. In one class, the soil is contaminated only with virgin petroleum products including any combination and amounts of gasoline, lubricating oils and fuel oils. In the second class, the soil contains hazardous materials which contaminate the soil. These hazardous contaminants can comprise: the RCRA eight heavy metals (As, Ba, Cd, Cr, Hg, Ni, Pb and Se); halogenated hydrocarbons, such as trichloroethylene, ethylene dibromide, transdichloro-ethylene, cistrichloroethylene, vinyl chloride, methylene chloride and 1,1,1-trichloroethane; and cyclic hydrocarbons with high partition coefficients, such as PAHs and PCBs. In some cases both petroleum products and hazardous materials may be contaminants in the soil. The distinction drawn between these two classes is an arbitrary one dictated by state and Federal regulations.

Recycled Waste

The recycled wastes can comprise shredded rubber tires, granulated or shredded plastics, such as plasticized polyvinyl butyral, and crushed and granulated glass. These are non-hazardous recyclable materials.

Reclaimed Asphalt Pavement (RAP)

Reclaimed Asphalt Pavement (RAP) comprises materials obtained from highways or streets by crushing, milling or planing existing pavements. The material has a reasonably uniform gradation from fine to course as defined by sieve analysis and is not contaminated by foreign materials.

Reclaimed Aggregate Materials (RAM)

Reclaimed Aggregate Material (RAM) comprises crushed concrete, bricks, gravel and stone. This material preferably has no particles larger than 2 inches. The material has a reasonably uniform gradation from fine to course as defined above and is not contaminated by foreign materials.

Mineral Filler

Mineral filler comprises approved Portland Cement, limestone dust, hydrated lime, stone float, stone dust, fly ash, or other suitable materials.

Emulsion

The emulsion comprises asphalt, water, pumice, soap, caustic soda and/or other non-hazardous emulsifiers. Preferably, SS-1 and SS-1h emulsions are used alone or in combination.

The cold mix asphaltic concrete disclosed herein can be pre-mixed and stored at a manufacturing site or mixed at the construction site. The following Table sets forth ranges of components used for preparation of the asphaltic concrete and will vary depending upon the ultimate use of the mix whether for base, surface pavings, etcetera.

| Material | Range % By Wgt. Min. | Max. |
| --- | --- | --- |
| Mineral aggregate | 20 | 50 |
| Roofing shingles | 4 | 6 |
| Contaminated soil | 40 | 60 |
| Asphalt emulsion | 6 | 12 |
| Shredded rubber tires | 0 | 4 |
| Granulated glass | 0 | 6 |
| Shredded plastics | 0 | 3 |

The ratio of contaminated soil to emulsion is approximately 5 to 10 parts soil to 1 part emulsion.

The preferred embodiment will be described with reference to the preparation of an asphaltic concrete base. The contaminated soil is first analyzed to determine the hazardous material content in ppm. Preferably, the amount is less than 10,000 ppm. If more than 10,000 ppm, clean fill can be used to reduce the ppm level. The hazardous materials which contaminate the soil may comprise a single contaminant or any combination of contaminants as heretofore defined. This standard is determined by State and/or Federal regulations on the handling and disposal of contaminated soils and is not to be construed as a limitation of the invention.

Referring to the drawing, graded asphalt roof cuttings shingles in an amount of about 5% by volume and less than about one inch in size from a source 10 are combined with contaminated soil from a source 12 and crushed recyclable mineral materials from a source 14, in a mixer 16. The soil is graded to 2 inch minus, 1 inch minus and ½ inch minus. Depending upon use, one of these graded soils is added in an amount of 40 to 60%. The aggregate is also graded to 2 inch minus, 1 inch minus and ½ inch minus. Depending upon use, one of these graded aggregates is added in an amount of 20 to 50%.

For this embodiment, the contaminated soil can have a composition of clay, silt, sand and gravel, a heavy metal content of less than 10,000 ppm and other hazardous material content of less than 10,000 ppm. After blending in a mixer 16, the mix is transferred to a pug mill (not shown) and SS-1 or SS-1h asphalt emulsion from a source 20 is added in an amount of 6 to 12%. After thorough mixing, the final product is stockpiled at 22.

Due to many state and federal regulations, hazardous materials may not be handled at all production facilities. Contaminated soil containing hazardous materials and non-hazardous aggregate may be added to the concrete at a later time at a licensed facility.

The amounts of materials used in any mix is first based on the end use of the concrete. Within the federal or state specifications, there is a certain latitude which allows for a 'fine tuning' of each production run. This fine tuning, as is well known in the art, is primarily a visual observation. If the mix appears too dry or too runny, aggregate, asphalt or emulsion is added as needed until the mix has the proper consistency.

In an alternative embodiment of the invention, certain additives are added to the mix either initially in the emulsion or in the mixing stage where the emulsion is mixed with the soil/aggregate mixture. Elastomers (rubber) natural or synthetic including sodium polysulfide, polychloroprene (neoprene); styrene-butadiene copolymers (SBR); butadiene-acrylonitrile copolymers; ethylene-propylene-diene rubbers; synthetic polyisoprene; butyl rubber; polyacrylonitrile; silicon; epichlorohydrin; and polyurethane can be added in an amount of from 0.5 to 5.0% by weight based on the total weight of emulsion used in the concrete. It is believed these elastomers enhance the binding of the materials present in the mix.

In still another embodiment of the invention, either alone or in combination with the use of the elastomers, a dessicant, such as $CaO.MgO$, is used in amounts of 0.5 to 5.0% by weight based on the total weight of the emulsion used in the mix to remove excess water, allow cold weather mixing and paving by raising the temperature of the mix up to about 20° F. Further, it is believed that the hydrated lime will facilitate the coating of the asphalt cement emulsions and increase cementitious action. Also, the lime breaks down deleterious organic matter to provide a more acceptable asphaltic concrete.

Test Results

Analyses of leachate from samples of a cured asphaltic concrete made using recycled crushed aggregate, ground asphalt shingles, contaminated soils, and asphalt emulsion showed levels of total petroleum hydrocarbons and heavy metals below the detection limits for the test. Crushed samples of bituminous concrete were soaked and agitated in an extraction fluid as provided in the U.S. EPA TCLP test. The resultant leachate was analyzed to determine residual levels of volatile organic compounds and total petroleum hydrocarbons.

Methodology

A sample was taken of a asphaltic concrete mixture made according to the invention. This sample was a mixture of recycled crushed aggregate, ground asphalt shingles, contaminated soil containing petroleum and lead, and an asphalt emulsion. Specifically, the sample was heated to 140° F. to speed curing and formed into a three inch diameter cylinder three inches high.

The test cylinders were subjected to the U.S. EPA TCLP method for performing leaching tests (40 CFR Part 261). The results showed that toxic levels of petroleum hydrocarbons and lead were not present in the leaching fluid used to make the extracts from the asphaltic concrete mixture.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described the invention, what is now claimed is:

1. A cold mix asphaltic concrete composition which fixes hazardous wastes therein which comprises:
asphalt roof cuttings containing fibers, contaminated soil containing hydrocarbons or hazardous materials and mineral aggregate which form a mixture, and an asphalt emulsion, the components mixed in effective amounts such that when the asphaltic concrete sets, the hydrocarbons or hazardous material will not leach from the set concrete composition.

2. The composition of claim 1, wherein said contaminants in said contaminated soils are selected from the group consisting of hydrocarbons and hazardous materials.

3. The composition of claim 2, wherein said hydrocarbons are from virgin petroleum products.

4. The composition of claim 3, wherein said petroleum products are selected from the group consisting of gasoline, lubricating oils and fuel oils.

5. The composition of claim 2, wherein said hazardous materials are selected from the group consisting of halogenated hydrocarbons, and cyclic hydrocarbons with high partition coefficients.

6. The composition of claim 5, wherein said halogenated hydrocarbons are selected from the group consisting of trichtoroethylene, ethylene dibromide, vinyl chloride, methylene chloride and 1,1,1-trichloroethane.

7. The composition of claim 5, wherein said cyclic hydrocarbons are selected from the group consisting of PAHs and PCBs.

8. The composition of claim 1, wherein the mineral aggregate comprises recyclable waste materials.

9. The composition of claim 8, wherein said recyclable waste materials are selected from the group consisting of shredded rubber tires, granulated or shredded plastics, and crushed and granulated glass.

10. The composition of claim 1, wherein said mineral aggregate mixture comprises mineral materials selected from the group consisting of reclaimed asphaltic pavement, construction concrete, reclaimed aggregate material and mineral filler.

11. The composition of claim 10, wherein said mineral aggregate comprises between 20 and 50 percent by weight of the concrete composition.

12. The composition of claim 1, wherein said roof cuttings comprise between 4 and 6 percent by weight of the concrete composition.

13. The composition of claim 12, wherein said roof cuttings are graded to below about 1 inch in size.

14. The composition of claim 1, wherein said contaminated soil comprises between 40 and 60 percent by weight of the concrete composition.

15. The composition of claim 1, wherein said emulsion comprises asphalt, water, pumice, soap and caustic soda.

16. The composition of claim 1, wherein the ratio of contaminated soil to said emulsion in said concrete composition is approximately 5 to 10 part soil to 1 part emulsion.

17. The composition of claim 1, wherein the emulsion includes an elastomer in an amount of 0.5 to 5.0 percent by weight based on the weight of the emulsion.

18. The composition of claim 15, wherein said emulsion further comprises an elastomer selected from the group consisting of sodium polysulfide, polychloroprene, styrene-butadiene copolymers, butadiene-acrylonitrile copolymers, ethylene-propylene-diene rubbers, synthetic polyisoprene, butyl rubber, polyacrylontrile, silicon, epichlorohydrin and polyurethane.

19. The composition of claim 15, wherein said emulsion further comprises a desiccant in an amount of 0.5 to 5.0 percent by weight based on the weight of the emulsion.

* * * * *